UNITED STATES PATENT OFFICE.

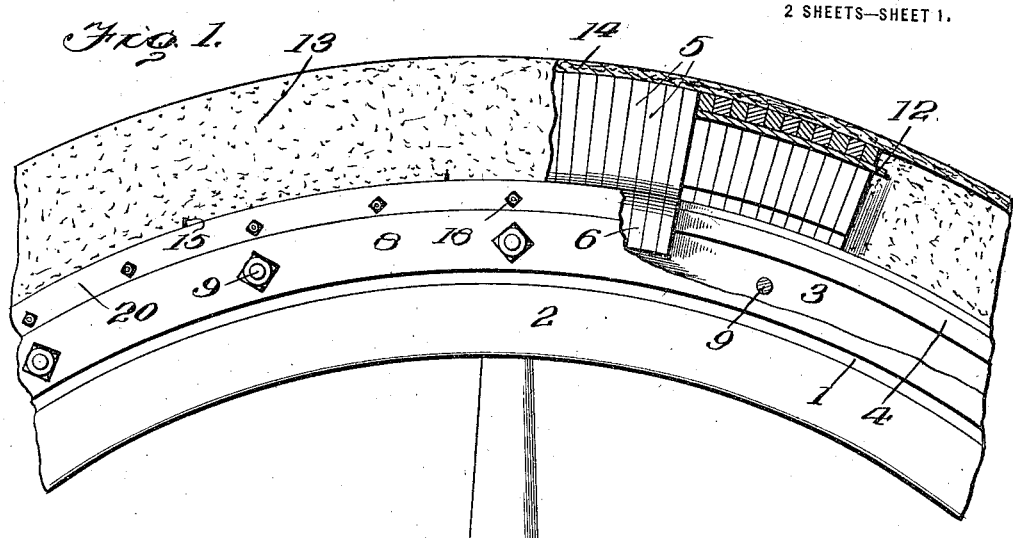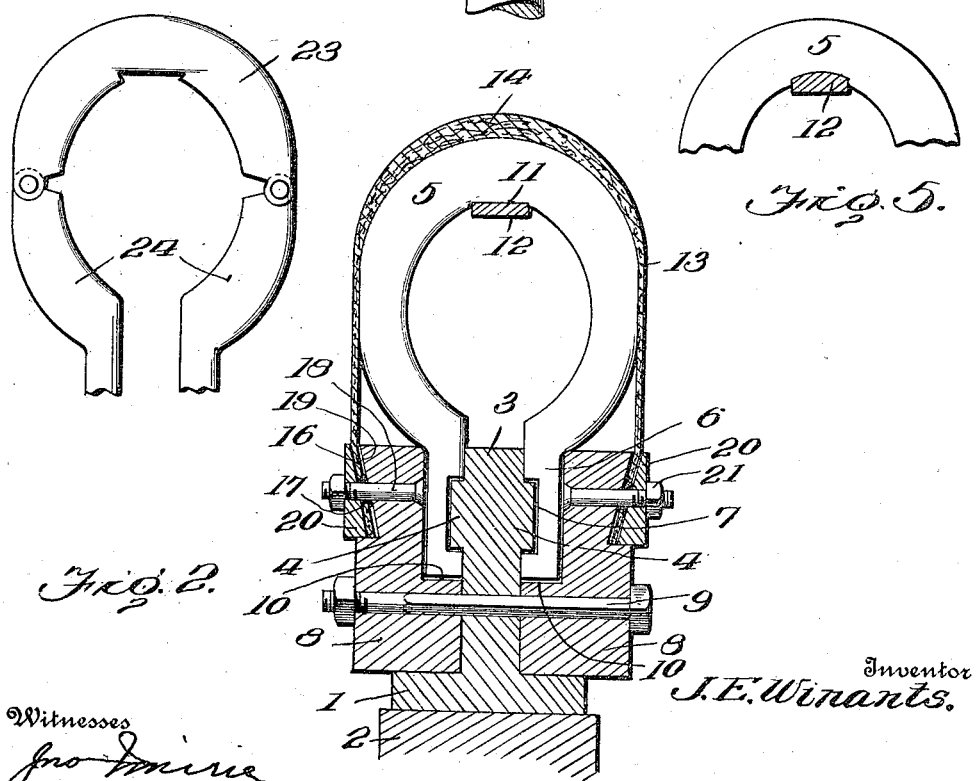

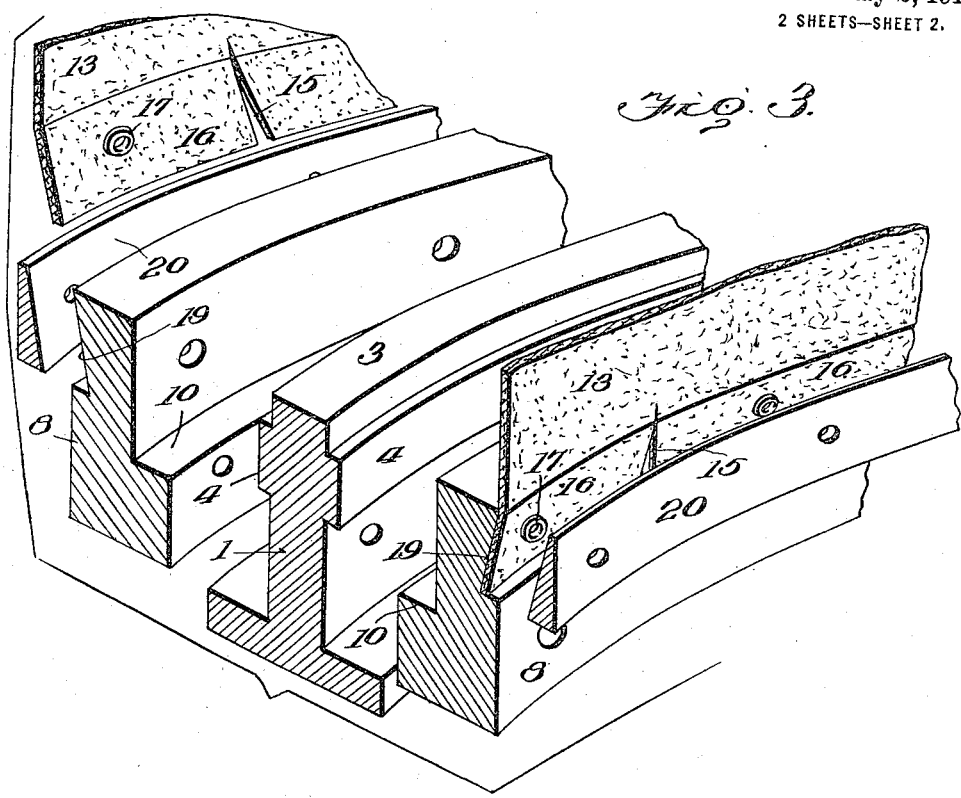
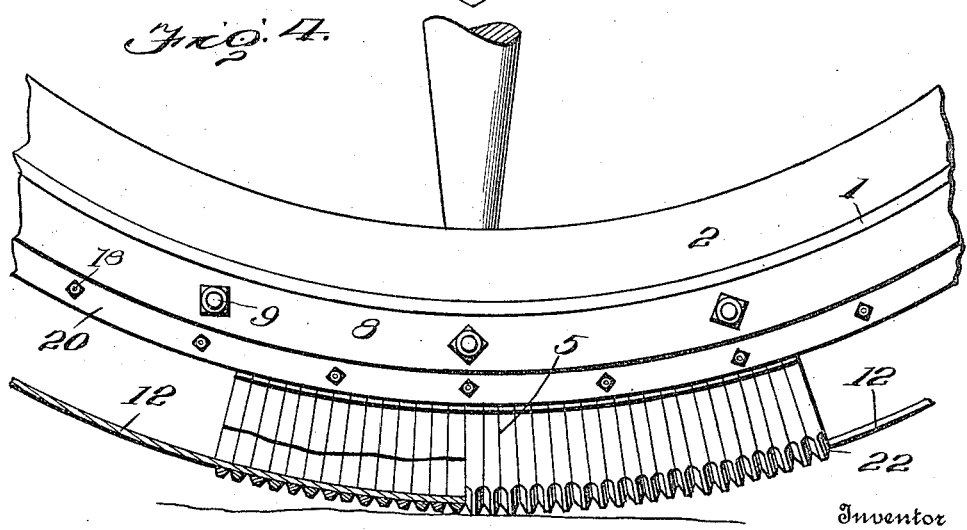

JOSIAH E. WINANTS, OF LITTLE FALLS, NEW YORK.

SPRING-TIRE.

1,181,498.   Specification of Letters Patent.   Patented May 2, 1916.

Application filed March 10, 1915.   Serial No. 13,422.

*To all whom it may concern:*

Be it known that I, JOSIAH E. WINANTS, a citizen of the United States, residing at Little Falls, in the county of Herkimer and State of New York, have invented certain new and useful Improvements in Spring-Tires, of which the following is a specification.

This invention relates to resilient tires, and has for its object the provision of a tire which will possess all of the easy riding qualities of a pneumatic tire without the liability of the same to be rendered useless by reason of a puncture or blow out.

The invention also has for its object the provision of a tire which may be used in all seasons and on all kinds of roads without danger of skidding.

The invention also seeks to provide a resilient tire which may be easily applied to or removed from a wheel and to which repairs may be easily and quickly made when necessary.

The several stated objects of the invention, and such other objects as will incidentally appear from the following description, are attained in the use of such a structure as is illustrated in the accompanying drawings, and the invention resides in certain novel features which will be particularly pointed out in the claims following the detailed description.

In the drawings: Figure 1 is a view, partly in side elevation and partly in section, of a portion of a wheel having my improved tire applied thereto; Fig. 2 is a transverse section; Fig. 3 is an enlarged detail sectional perspective view, showing parts of the device disassembled but approximately in their proper relative positions; Fig. 4 is a view similar to Fig. 1 but showing a different form of the tire; Fig. 5 is a detail view showing a modification; Fig. 6 is a detail view showing another modification.

In carrying out my invention, I employ a body or base member 1 which may be secured to the felly 2 of the wheel in any preferred or convenient manner. This body or base member 1 is T-shaped in its cross sectional outline and extends entirely around the wheel, as will be readily understood, the stem 3 of the said body being provided on its opposite faces near its outer end with ribs 4 co-extensive with the body.

The tread of the tire consists of a series of resilient members 5 which are substantially rings disposed transversely to the body or base member 1 and provided with jaws or retaining members 6 adapted to pass on opposite sides of the stem 3 and engage the ribs 4, the inner opposed faces of said retaining members being provided with grooves 7, as shown most clearly in Fig. 2, or otherwise formed to fit closely to said ribs. These tread members are preferably constructed of spring steel so that the jaws or retaining members 6 may be sprung apart to be slipped over the stem and the ribs 4, and after the tread members have been so engaged and arranged in position they are secured against withdrawal by the clamping jaws or members 8 which are fitted against the opposite sides of the stem 3 and secured rigidly thereto by bolts 9 inserted through the stem and the clamps, as shown in Fig. 2. The said jaws or clamps are constructed with ribs or ledges 10 on their inner sides which engage against the stem 3 of the base member and fit under the ends of the retaining members 6 of the rings 5, as shown in Fig. 2, and the upper portions of the jaws conform to the configuration of the members 6 so that the said rings will be held firmly and squarely against the stem and against the ribs 4 thereon. The bolts 9 are preferably constructed with angular shanks so that they will be held against rotation when the retaining nuts thereon are being turned home, and the heads of the bolts are also preferably angular so that they may be easily engaged by a wrench or other tool in securing the parts in position.

The tread members or rings 5 are preferably provided with notches 11 on their inner faces at points remote from the retaining members 6, and these notches 11 are engaged by a spring steel band or ring 12 which extends throughout the tire. This band or ring 12 is preferably endless, but it may, of course, be constructed in sections connected by suitable fastenings and it may be fitted to the tread members in any convenient manner. The outermost surfaces of the tread members 5 are preferably smooth, and the said members fit closely together, as shown in Fig. 1, so that the outermost faces thereof will form a continuous smooth surface to roll upon the ground.

To obviate any noise that may possibly be noticed in the tire when the same is in use, I preferably employ a cover or casing 13 which may be of combined rubber and fabric of the same characteristics as the casings now in general use and will preferably have a thickened or reinforced tread portion 14. The side portions of this casing or covering 13 are divided along their edges by incisions 15, thereby forming flaps 16 which fit against the outer faces of the clamping members 8 and will accommodate the difference between the inner and outer circumferences of the casing so that the side members of the casing will lie smoothly around the tire. These flaps 16 are perforated, and eyes or similar reinforcing members 17 are fitted in the perforations. Bolts 18 are mounted in the upper portions of the clamping members 8 and are countersunk in the inner sides thereof, as shown in Fig. 2, so as to avoid interference with the retaining members of the tread rings, and these bolts pass through the reinforcing members 17 so as to retain the cover in position. The outer faces of the clamping members 8 at the outer edges thereof are beveled inwardly, as shown at 19, and retaining members or rings 20 are fitted to the said beveled portions 19 over the flaps or inner edges of the cover or casing and thereby serve to hold the cover close to the tire. The nuts 21 on the bolts 18 are turned home against the rings 20 and thereby serve to securely clamp the cover in position, while the beveled disposition of the opposed surfaces of the rings and the clamping members 8 serve to effectually retain the cover against withdrawal.

It will be readily seen from the foregoing description, taken in connection with the accompanying drawings, that I have provided a tire which will resemble a pneumatic tire in appearance but which cannot be rendered useless by cuts or punctures or by blow-outs. The tread rings 5 and the annular band 12 engaging the said rings will be stronger than a pneumatic tire and may be of any desired size according to the style and size of the vehicle to which the tire is to be applied. As the wheel rolls along the road, the resiliency of the tread members 5 and the ring 12 engaging the same will permit the wheel to yield to irregularities in the surface of the road and will effectually accommodate shocks due to such irregularities so that the vehicle will ride easily and smoothly.

Should any tread ring 5 be broken from any cause, it may be removed and a new ring substituted without requiring the provision of an entirely new tire and without requiring the disassembling of the entire tire. To accomplish this result, it is only necessary to turn the wheel until the broken or damaged tread ring is at a high point of the wheel. The clamping jaws may be loosened in that section of the wheel which contains the damaged tread ring after which the ring may be easily sprung so as to be removed from its engagement with the base member and a new tread ring then inserted and sprung into engagement with said member.

The tread rings 5 will preferably have a smooth outer surface or a tread which will be plane faced longitudinally or circumferentially of the tire. If it should be desired, however, to use the vehicle over snow or ice or on sandy or other poor roads, the tread rings may be constructed as shown in Fig. 4, in which the outer portions of said rings are shown as provided with beveled portions 22 on their opposite sides whereby ridges or ground-engaging surfaces are formed. These ground-engaging ridges may be sharpened or otherwise formed so as to more readily take into the ground and effectually hold the tire against slipping. With the form of tread ring shown in Fig. 4 and just described, the outer cover or casing may be omitted.

While I prefer to construct the individual tread members 5 as integral structures, they may be formed in sections comprising an outer tread section 23 and inner side sections 24 which are connected to the ends of the tread section by hinges, as shown in Fig. 6. These sections may, in actual practice, be found to be slightly more resilient than integral tread members. It will also be noted that the annular band or resilient ring 12 may be of any desired cross sectional outline, and in Fig. 2 I have shown the said band rectangular, while in Fig. 5 I have shown the same as provided with an outer face convex in cross section.

In Fig. 6 the band groove is of a form to have a dove-tailed engagement with the band.

Having thus described the invention, what is claimed as new is:—

1. A tire comprising a base member having an annular outwardly projecting stem, a plurality of resilient tread rings disposed beyond said stem and having retaining members projecting on opposite sides of the stem, and clamping jaws fitted to the outer faces of said retaining members and to the stem between the inner end thereof and the inner ends of the retaining members and secured against the opposite sides of the said retaining members and the stem.

2. A tire comprising a T-shaped base member having its head adapted to be secured to the periphery of a felly with its stem projecting outwardly therefrom and provided with longitudinal ribs on the sides of the stem near the outer edge thereof, tread rings disposed beyond and transversely to the said stem and having retaining members adapted to fit against opposite sides of the stem and provided in their inner faces with grooves to engage around the ribs on the stem, clamping jaws fitted against opposite sides of the stem and the outer faces of said retaining members, and means for securing said jaws to the stem.

In testimony whereof I affix my signature in presence of two witnesses.

JOSIAH E. WINANTS. [L. S.]

Witnesses:
ROBERT F. LIVINGSTON,
E. J. DIEFENDORF.